(12) United States Patent
Kruse et al.

(10) Patent No.: US 7,754,967 B2
(45) Date of Patent: Jul. 13, 2010

(54) ELECTRICAL WIRING SYSTEM

(75) Inventors: Russell E. Kruse, St. Charles, MO (US); Russell L. Bryant, Vernon Hills, IL (US)

(73) Assignee: Applied Technology and Solutions, St. Charles, MO (US)

( * ) Notice: Subject to any disclaimer, the term of this patent is extended or adjusted under 35 U.S.C. 154(b) by 0 days.

(21) Appl. No.: 11/385,346

(22) Filed: Mar. 20, 2006

(65) Prior Publication Data

US 2006/0175070 A1 Aug. 10, 2006

Related U.S. Application Data

(60) Continuation of application No. 10/913,084, filed on Aug. 6, 2004, now abandoned, which is a division of application No. 10/141,695, filed on May 7, 2002, now Pat. No. 6,774,307.

(51) Int. Cl.
*H01H 9/02* (2006.01)
*H02G 3/08* (2006.01)

(52) U.S. Cl. .................... 174/53; 174/481; 174/50; 174/58; 220/3.2; 220/3.3; 439/535

(58) Field of Classification Search .................. 174/53, 174/57, 48, 54, 49, 50, 59, 61, 58, 480, 481; 220/3.94, 421, 242, 4.02, 241, 3.2–3.9; 439/535, 439/949, 928
See application file for complete search history.

(56) References Cited

U.S. PATENT DOCUMENTS

| 1,938,309 | A | * | 12/1933 | Williams | 174/58 |
| 2,297,862 | A | * | 10/1942 | Bachmann | 220/3.6 |
| 2,433,917 | A | * | 1/1948 | McCartney | 174/53 |
| 2,875,915 | A | | 3/1959 | Buckels | 220/3.7 |
| 3,609,647 | A | * | 9/1971 | Castellano | 174/53 |
| 3,622,029 | A | | 11/1971 | Ware | |
| 3,641,472 | A | | 2/1972 | Phillips, Jr. | |
| 3,707,697 | A | * | 12/1972 | Izumi | 439/928 |
| 3,814,834 | A | | 6/1974 | Glader | |
| 3,879,101 | A | * | 4/1975 | McKissic | 439/535 |
| 3,975,074 | A | | 8/1976 | Fuller | |
| 4,039,235 | A | | 8/1977 | Thibeault | |
| 4,125,767 | A | | 11/1978 | Silver | |
| 4,203,638 | A | | 5/1980 | Tansi | |
| 4,273,957 | A | * | 6/1981 | Kolling, Jr. | 174/53 |
| 4,504,103 | A | * | 3/1985 | Woedl | 439/535 |
| 4,520,306 | A | | 5/1985 | Kirby | |

(Continued)

*Primary Examiner*—Angel R Estrada
(74) *Attorney, Agent, or Firm*—Polster, Lieder, Woodruff & Lucchesi, LC (57) ABSTRACT

A system for accessing an electrical wiring network from opposing sides of a wall. The wall includes at least one structural support and a wall surface. The system includes an electrical box having a perimeter wall and two open sides. The open sides are located at opposing ends of the perimeter wall, thereby defining a passageway through the electrical box. Additionally, the system includes a pair of frames coupled to the electrical box at the open sides, and one or more electrical outlets coupled to each frame. Each outlet includes a body that includes a first connector matable with a second connector. The second connector includes a plurality of integrally formed leads having distal ends that are directly connectable to an electrical power supply distribution network such that when the second connector is mated with the first connector electrical power can be supplied to each outlet.

20 Claims, 4 Drawing Sheets

U.S. PATENT DOCUMENTS

| | | |
|---|---|---|
| 4,725,249 A * | 2/1988 | Blackwood et al. ......... 439/535 |
| 4,842,551 A | 6/1989 | Heimann |
| 4,854,885 A | 8/1989 | Bowden, Jr. et al. |
| 5,015,203 A | 5/1991 | Furrow |
| 5,108,313 A | 4/1992 | Adams |
| 5,178,555 A | 1/1993 | Kilpatrick et al. |
| 5,297,973 A | 3/1994 | Gorman |
| 5,582,522 A | 12/1996 | Johnson |
| 5,839,594 A | 11/1998 | Barbour |
| 5,964,618 A | 10/1999 | McCarthy |
| 5,965,844 A | 10/1999 | Lippa |
| 6,028,268 A | 2/2000 | Stark et al. |
| 6,045,374 A | 4/2000 | Candeloro |
| 6,156,971 A | 12/2000 | May |
| 6,309,248 B1 | 10/2001 | King |
| 6,376,770 B1 | 4/2002 | Hyde |
| 6,494,728 B1 | 12/2002 | Gorman |
| 6,563,049 B2 | 5/2003 | May |
| 6,994,585 B2 * | 2/2006 | Benoit et al. .................. 174/58 |
| 7,189,110 B1 * | 3/2007 | Savicki, Jr. .................. 174/58 |
| 2002/0052139 A1 | 5/2002 | Gorman |
| 2002/0055301 A1 | 5/2002 | Gorman |

* cited by examiner

ELECTRICAL WIRING SYSTEM

CROSS REFERENCE TO RELATED APPLICATIONS

This application is a Continuation of U.S. patent application Ser. No. 10/913,084 filed on Aug. 6, 2004, which is a Divisional of U.S. Pat. No. 6,774,307, filed May 7, 2002 and issued on Aug. 10, 2004. The disclosure of the above applications are incorporated herein by reference.

FIELD OF INVENTION

The invention relates generally to electrical outlet systems, and more specifically to a through-wall electrical box system designed to reduce labor and material costs associated with installing electrical wiring networks in various structures.

BACKGROUND OF THE INVENTION

Efforts are continuously being made to simplify electrical systems or networks, and the components used in these networks which represent a substantial percentage of the labor and material in commercial and residential construction.

Presently, when it is desired to locate electrical outlets and/or electrical control modules such as switches, rheostats, or any other similar electrical control module that monitors or controls the flow of electricity, on opposite sides of a common wall or partition, an electrician typically installs separate electrical boxes facing in opposite directions. Electrical outlets are sometimes referred to as electrical sockets or receptacles, but will be referred to as electrical outlets herein. Additionally, each electrical box is typically installed on wall structural supports, e.g. wall studs. This procedure is time consuming and involves using extra electrical wire, boxes, standoffs, conduit and other components used during installation of an electrical wiring network, or system. Further, the electrician must avoid cavities in the walls that will not accommodate two electrical boxes in a certain area of the wall or partition. For example, electrical boxes cannot be installed between studs that define a cold air return space.

Additionally, electrical outlets and control modules are typically installed by attaching wires to screws appending from the sides of the outlet or the sides of the control module. These screws can present a safety hazard when they are connected within a live electrical wiring network, e.g. having live electrical current flowing through the network, and come into contact with a conductive surface, such as a metal electrical box or metal wall stud. Also, if the electrical outlet or control module is connected to a live wiring network, a person could be severely shocked upon contacting the screws. Furthermore, the screws can cause accidental injuries to the hands of the person installing the outlet or the control module if a screwdriver that is used to tighten the screws slips off one of the screws.

Through-way electrical boxes have been developed in an attempt to reduce the additional labor and material costs incurred in the installation of electrical wiring networks. However, known through-wall boxes do not allow for using one cavity in a wall to install electrical outlets and/or control modules on opposing sides of the wall without subjecting the electrician, or person installing the outlets and/or control modules, to time consuming mechanical detail work. Some known through-wall boxes require numerous components and fittings which must be adjusted during the installation process, while other known through-wall boxes are not suitable for installing multiple electrical outlets and/or control modules on each side of the wall.

Additionally, plaster ring plates that cover existing electrical boxes, also referred to herein as frames, typically include an aperture for receiving the electrical outlet and/or control module that is centered in the frame. This placement of the aperture does not permit the most efficient use of space within the electrical box nor ease of electrical outlet and/or control module installation in a back-to-back installation.

Furthermore, at least some electrical codes require the electrician to install pigtails on each outlet and control module, which are then connected to the incoming power source, e.g. the electrical wiring network, with electric wire nuts. The installation of pigtails is labor intensive and increases the material costs of installing outlets and control modules.

Thus, it would be desirable to develop a system that provides access to an electrical wiring network from opposing sides of a wall. More specifically, it would be desirable to provide a through-wall electrical system that overcomes the shortcoming of known through-wall systems, thereby reducing labor and material costs of installing such systems. For example, it would be desirable to provide a through-wall electrical system that reduces the complicity of installation caused by numerous components and fittings that must be adjusted during the installation process. Thus, the system should be suitable for installing multiple electrical outlets and/or control modules on each side of the wall, and should also reduce the risks associated with connecting the outlets and/or control modules to the wiring network via screws appending from the outlets and control modules. Additionally, the system should also satisfy code requirements to connect pigtails to the outlet and/or control module prior to connecting the module.

BRIEF SUMMARY OF THE INVENTION

In a preferred embodiment of the present invention, a system is provided for accessing an electrical wiring network from opposing sides of a wall. The wall includes at least one structural support and a wall covering coupled to the structural supports. The system includes a through-wall electrical box having a perimeter wall and two open sides. The open sides are located at opposing ends of the perimeter wall, thereby defining a passageway through the electrical box. Additionally, the system includes a pair of frames coupled to the electrical box at the open sides, and at least one electrical outlet coupled to the frames. Each outlet includes a body that includes a first connector matable with a second connector. The second connector includes a plurality of integrally formed leads having distal ends that are directly connectable, e.g., using twist-on connectors, to an electrical power supply distribution network such that when the second connector is mated with the first connector electrical power can be supplied to each outlet.

In another preferred embodiment of the present invention, a method is provided for accessing an electrical wiring network from opposing sides of a wall having at least one structural support and a wall surface coupled to the structural support. The method comprises providing an electrical box having a perimeter wall and two open sides that form a passageway through the electrical box, providing a pair of frames wherein each frame includes an aperture located off-center in the frame, and coupling one frame to each open side such that the apertures of the frames are positioned caddy-corner on opposing sides of the electrical box thereby providing space behind each aperture within said electrical box.

In yet another preferred embodiment of the present invention, an electrical outlet is provided for use with an electrical wiring network. The outlet includes a plurality of integral leads extending therefrom that connect to the wiring network.

In still another preferred embodiment of the present invention, a system is provided for accessing an electrical wiring network from opposing sides of a wall that includes at least one structural support and a wall surface coupled to the structural support. The system includes an electrical box having a perimeter wall and two open sides. The open sides are located at opposing ends of the perimeter wall, thereby defining a passageway through said electrical box. Additionally, the system includes a pair of frames. Each said frame includes an aperture located off-center in the frame. The frames couple to the open sides such that the apertures are positioned caddy-corner on the electrical box. Furthermore, the system includes at least one electrical outlet that is coupled to the apertures.

In still yet another preferred embodiment of the present invention, an electrical box frame is provided that includes an aperture located off-center within the frame. The aperture is suitable to receive at least one electrical outlet, and the frame is coupled to the electrical box such that space is provided behind the aperture within the electrical box when the electrical outlet is coupled to the aperture.

BRIEF DESCRIPTION OF THE DRAWINGS

The present invention will become more fully understood from the detailed description and accompanying drawings, wherein.

DETAILED DESCRIPTION OF THE INVENTION

Figure 1:
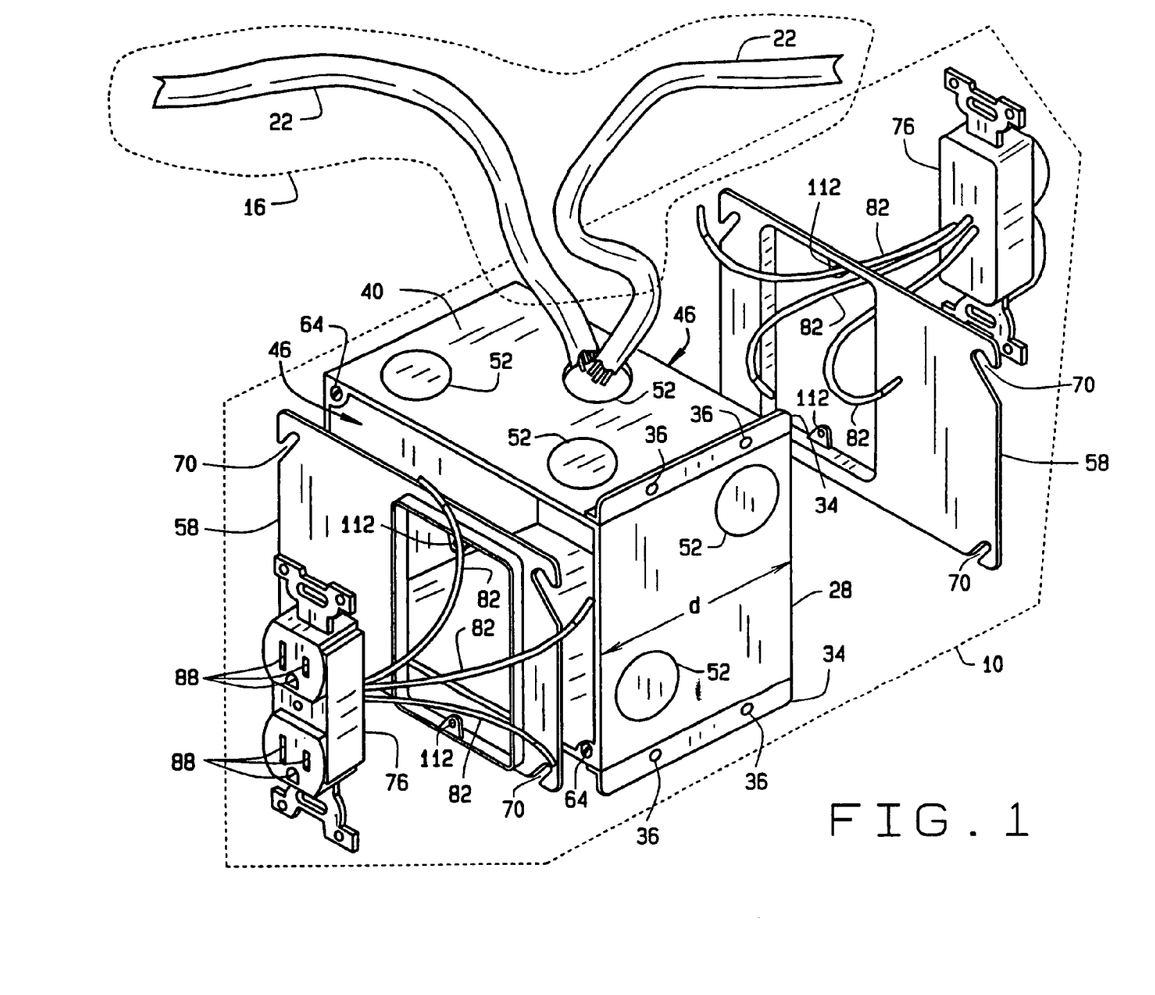
FIG. 1 is a schematic of a system for accessing an electrical wiring network from opposing sides of a common wall, in accordance with a preferred embodiment of the present invention.

FIG. 1 is a schematic of a system 10 for accessing an electrical wiring network 16 from opposing sides of a common wall or partition (not shown), in accordance with a preferred embodiment of the present invention. Wiring network 16, sometimes referred to as an electrical system, is a network of wires installed in a building or other structure that provide and distribute electrical power throughout the building or structure. Wiring network 16 includes a plurality of network branches 22 which are installed inside the walls or partitions of the building or structure, thereby providing and distributing power throughout the building or structure. As used herein, the term plurality is defined as at least two. Wiring network 16 is typically connected to a load center (not shown), also referred to as a breaker box or fuse box, which is the incoming point for electrical service to a residential or commercial building. However, for smaller buildings or structures other than buildings, wiring network 16 may be a sub-network of a larger wiring network and therefore not directly connected to a breaker box.

It is generally known that walls and partitions are typically constructed of at least one structural support, such as a wall stud, and have a wall or partition surface attached to opposing sides of the structural support. System 10 includes a through-wall electrical box 28 that is mounted to one of the structural supports using mounting devices 34 prior to the wall surface being attached to the structural support. Although electrical box 28 is shown in FIG. 1 as having a rectangular shape, it is envisioned that electrical box 28 could have any suitable shape, such as circular, oval, or square. Mounting devices 34 include mounting apertures 36 for receiving nails, screws, or any other fastening device suitable to mount electrical box 28 to the wall or partition structural support. Electrical box 28 is constructed of any material suitable for use in electrical wiring networks, such as plastic or metal. Although mounting device 34 is shown in FIG. 1 as an L-shaped bracket coupled to electrical box 28, it should not be so limited. Mounting device 34 could be any device, system or apparatus suitable for mounting any type of electrical box or similar device to the structural support of a wall or partition, as is well known by those skilled in the art.

Electrical box 28 includes a perimeter wall 40 and two open sides 46 located at opposing ends of perimeter wall 40 thereby defining a passageway through electrical box 28. In a preferred embodiment, perimeter wall 40 has a depth 'd' approximately equal to the width of the structural support to which it is to be mounted. Therefore, electrical box 28 is constructed such that perimeter wall 40 has a specific predetermined depth 'd' that is based upon the width of the structural support used to construct the wall in which electrical box 28 is to be installed. Additionally, in the preferred embodiment, perimeter wall 40 has a uni-body molded construction or is constructed from a single piece of material joined at opposing ends. In an alternate embodiment, electrical box 28 is constructed such that perimeter wall 40 is adjustable to be adapted to walls of various thicknesses. In another alternate embodiment, perimeter wall 40 is constructed of at least two pieces of material joined end-to-end. In yet another embodiment, electrical box 28 is constructed such that perimeter wall 40 has a depth 'd' approximately equal to the width of the structural support plus twice the thickness of the wall surface that is to be attached to both sides of the structural support. Thus, perimeter wall 40 would have a depth 'd' that extends past both outer edges of the structural support a distance approximately equal to the thickness of the wall surface.

Additionally, electrical box 28 includes at least one wiring aperture 52 that allows at least one network branch 22 to pass therethrough. Wiring aperture 52 is shown in FIG. 1 as a wiring aperture commonly known in the art as a knockout, but should not be so limited. Wiring aperture 52 could be any suitable aperture in electrical box 28 configured to allow at least one network branch 22 to pass therethrough. For example, wiring aperture 52 could be an aperture in electrical box 28 fashioned to provide a strain relief feature that allows network branch 22 pass therethrough, but inhibits network branch 22 from being easily retracted from wiring aperture 52. Although FIG. 1 shows wiring network 16 and network branches 22 free from an enclosure, such as electrical conduit, it is envisioned that wiring network 16 may include a plurality of interconnectable enclosure sections, for example electrical conduits. The interconnectable enclosure sections enclose network branches 22, are connected to the structure, and coupled at one end to electrical box 28 utilizing a wiring aperture 52. Therefore, it is to be understood that wiring aperture 52 may be formed in perimeter wall 40 in any known manner for accommodating one or more enclosure sections that enclose and provide protection for network branches 22.

System 10 further includes a pair of frames 58 that are coupled to electrical box 28 at open sides 46 prior to the wall covering being coupled to the structural support. Frames 58 are sometimes referred to in the art as plaster rings or plaster frames, and are constructed of any material suitable for use in electrical wiring networks, such as plastic or metal. In the preferred embodiment, frames 58 are coupled to electrical box 28 using a plurality of screws 64 inserted through a plurality of frame slots 70. Alternatively, frames 58 are coupled to electrical box 28 in any other suitable manner. For example, frames 58 could include apertures through which screws 64 would be inserted, or screws 64 could be replaced with any other type of suitable connector such as, rivets or nylon press-in snap retainers. Further yet, frames 58 could be hingedly connected at one side of perimeter wall 40 and coupled to perimeter wall 40 at the opposing side using any type of connector such as screws, rivets, a latch, or nylon press-in snap retainers. Frames 58 are further described below in reference to FIG. 2.

In the preferred embodiment, system 10 includes at least one electrical outlet 76 that includes a plurality of integral leads 82. Again, plurality as used herein means at least two. At least one lead 82 is connected to a network branch 22 thereby providing electrical power to the respective electrical outlet 76, that is coupled to one frame 58. Electrical outlet 76 provides a source of, or connection point to, electricity flowing through electrical network 16. A person accesses the electricity by inserting a suitable plug adapter connected to any device that utilizes electricity (not shown), into mating electrical receptor holes 88 in electrical outlet 76. Electrical outlet 76 is sometimes known in the art as an electrical socket, or an electrical receptacle, but will be referred to herein as an electrical outlet. Electrical outlet 76 is further described below in reference to FIG. 3.

Figure 2:
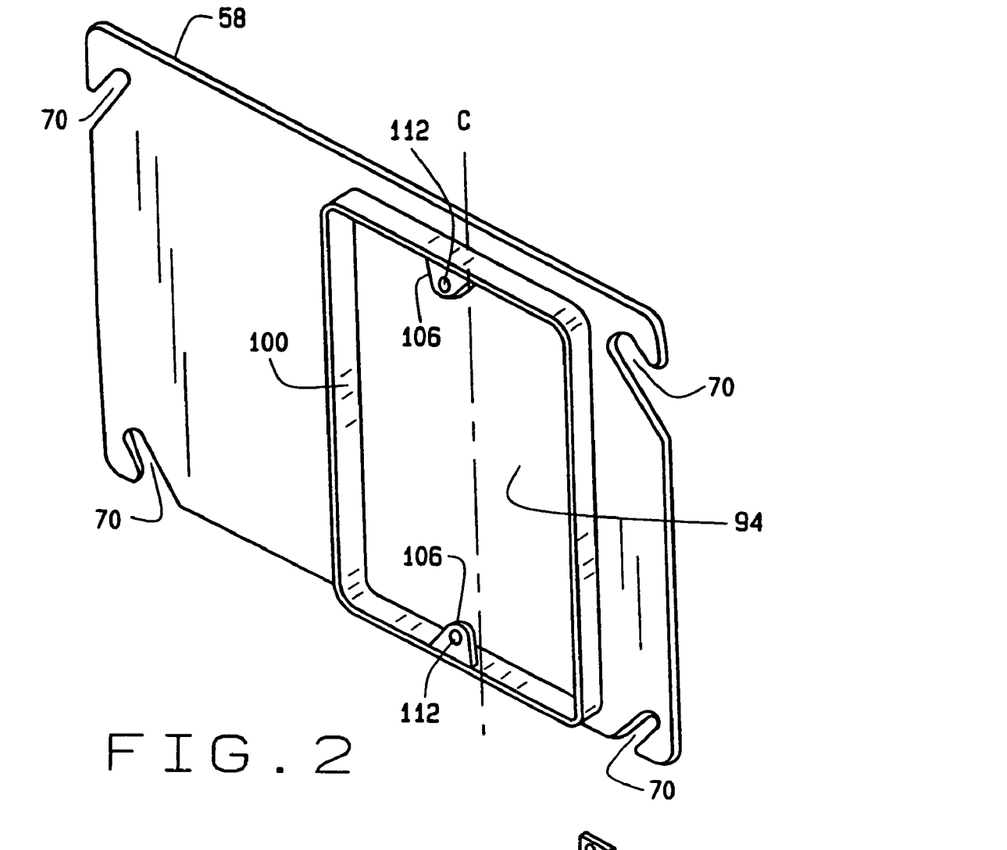
FIG. 2 is a perspective view of a frame used in the system shown in FIG. 1.

FIG. 2 is a perspective view of one of the frames 58 shown in FIG. 1. As described above, frames 58 couple to electrical box 28 (shown in FIG. 1) at open sides 46 (shown in FIG. 1) prior to the wall surface being coupled to the structural supports. Although frame 58 is shown in FIG. 2 having a rectangular shape it should not be so limited. It is envisioned that frame 58 could have any suitable shape, such as circular, oval, or square. Each frame 58 includes a frame aperture 94 that is located off-center in frame 58, such that a centerline 'C' of aperture 94 is substantially closer to one edge of frame 58 than the opposing edge of frame 58. Aperture 94 receives electrical outlet 76 (shown in FIG. 1) when outlet 76 is coupled to frame 58. In an alternate embodiment, aperture 94 of at least one frame 58 receives at least two electrical outlets 76. Although aperture 94 is shown in FIG. 2 having a rectangular shape, it is envisioned that aperture 94 could have any suitable shape, such as circular, oval, or square, and could have dimensions larger or smaller with respect to the overall size of frame 58 than is shown in FIG. 2. In the preferred embodiment, aperture 94 includes a raised lip 100 extending along the perimeter of aperture 94 that has a predetermined height approximately equal to a thickness of the wall surface to be coupled to the structural support on which outlet box 28 is mounted. Raised lip 100 includes a plurality of tabs 106 that include threaded tab holes 112. Outlet 76 is mounted within aperture 94 by coupling outlet 76 to tabs 106. In an alternative embodiment, aperture 94 includes at least two raised lips 100 located at separate points along the perimeter of aperture 94, and each lip 100 includes at least one tab 106 that includes at least one threaded hole 112.

Figure 3:
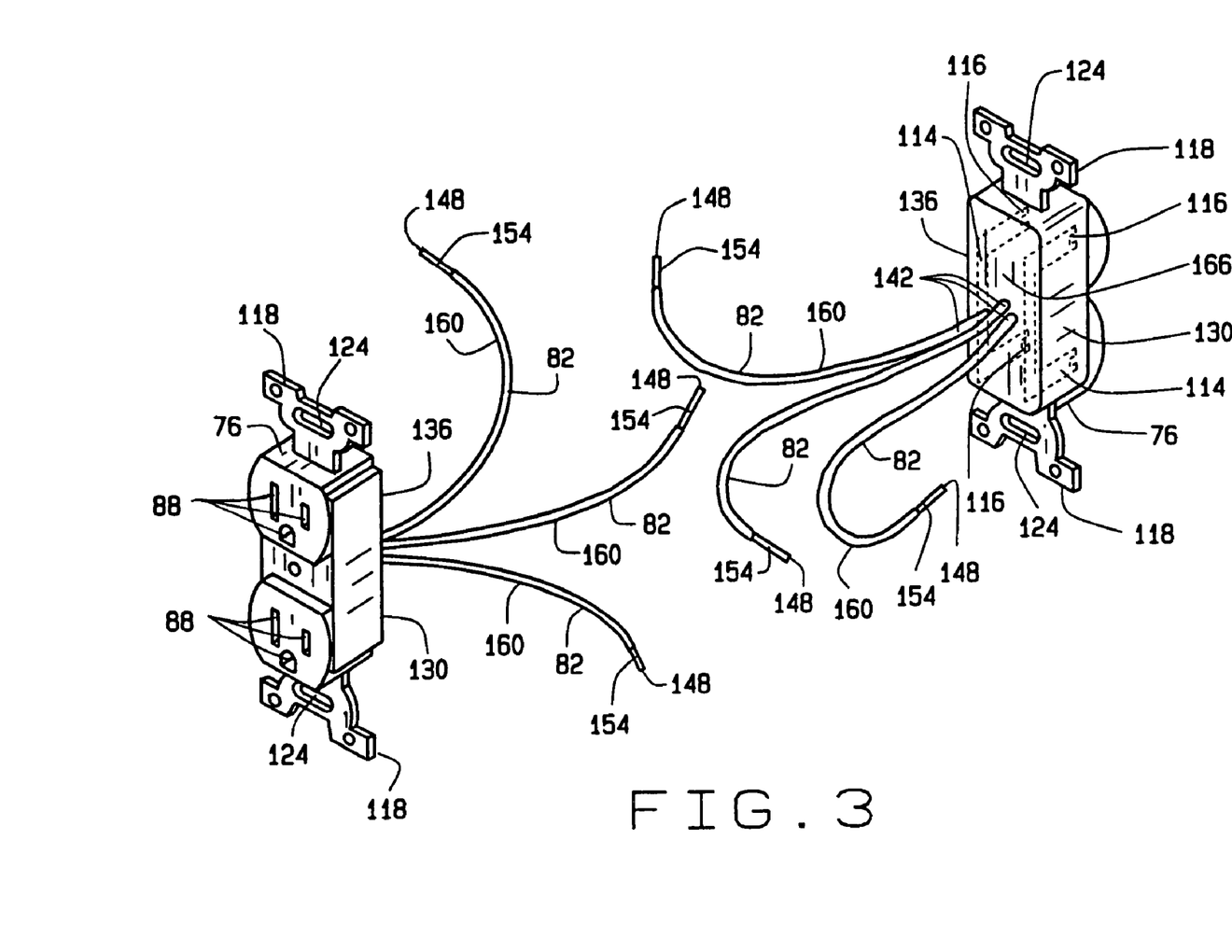
FIG. 3 is a perspective view of an electrical outlet used in the system shown in FIG. 1.

FIG. 3 is a perspective front and back view of electrical outlet 76 used in the system 10 (shown in FIG. 1). As described above, outlet 76 includes a plurality of integral leads 82 wherein at least one lead 82 is connected to wiring network 16 (shown in FIG. 1). Additionally, outlet 76 includes an internal conductive electrical receptor structure 114 having a plurality of receptors 116 configured to receive the plug adapter when the plug adapter is inserted through mating electrical receptor holes 88. Integral leads 82 are connected to electrical receptor structure 114 such that when outlet 76 is connected to wiring network 16, via leads 82, electrical current is provided at outlet 76 accessible via electrical receptor holes 88. Furthermore, each electrical outlet 76 includes at least one outlet mounting bracket 118 that includes at least one mounting hole 124. In the preferred embodiment, outlet 76 is coupled to frame 58 (shown in FIG. 1) by inserting a screw through outlet mounting bracket hole 112 and threading the screw into tab hole 112 (shown in FIG. 1). Alternatively, outlet 76 can be mounted to one of frames 58 by inserting a rivet or nylon press-in snap retainer through bracket hole 112 and into tab hole 112, or by any other suitable means.

Electrical outlet 76 further includes an outlet housing 130 constructed of a non-conductive material, such as plastic or rubber. In addition to being constructed of a non-conductive material, outlet housing 130 has a comprehensively non-conductive outer surface 136 free from conductive appendages or surfaces that are electrically active, or live, when outlet 76 is connected to wiring network 16. Known electrical outlets do not include leads 82, but instead typically include metal screw posts appending from the outlet housing to which a wiring network is connected either directly or via pigtails connected to the metal screw posts. In the present invention, the entire outer surface 136 of each outlet housing 130 is free from any actively conductive appendages or surfaces, such as metal screw posts, or any other actively conductive metal appending from, protruding from, attached to, or otherwise exposed via an aperture in outlet housing 130 that would be in contact with or connected to wiring network 16.

As used herein 'actively conductive' appendage or surface is defined to mean any appendage or surface that is designed to have live current flowing through it once outlet 76 is connected to wiring network 16 as described herein. Therefore, when wiring network 16 is connected to an outlet 76, outlet housing outer surface 136 can be contacted by a person, or come into contact with a conductive surface, such as an outlet box 40 constructed of metal, without the risk of electrical shock or shorting. It is envisioned that housing 130 is of two part construction comprising a first part having receptor holes 88 and a second part from which leads 82 extend.

Each lead 82 includes a proximal end 142, a distal end 148, a wire 154, and an insulating layer 160 covering wire 154. Insulating layer 160 is constructed of any electrically insulating material, such as plastic or rubber. In the preferred embodiment, at least one lead 82 has a predetermined length of insulating layer 160 pre-stripped from distal end 148 thereby exposing a predetermined length of wire 154. Outlet 76 is thereby connected to wiring network 16 by connecting the pre-stripped end of at least one lead to a network branch 22. In an alternate embodiment, insulating layer 160 covers wire 154 from proximal end 142 to distal end 148, and outlet 76 is connected to wiring network 16 by stripping a desired length of insulating layer 160 from at least one lead 82, thereby exposing a desired length of wire 154, then connecting the exposed length of wire 154 to a network branch 22.

In the preferred embodiment, proximal end 142 of each lead 82 extends through outlet housing 130 and is connected to actively conductive electrical receptor structure 114 inside outlet 76 such that each lead 82 is integrally formed, or assembled, with outlet 76. Proximal ends 142 are connected to receptor structure 114 inside outlet 76 using any suitable means such as soldering ends 142 to receptor structure 114, or using a crimping type connection, or using any type of suitable connector assembly, e.g. a jack, a plug, or a strain relief. Therefore, leads 82 are integrally formed or assembled with outlet 76.

Furthermore, in the preferred embodiment, leads 82 extend from a back side 166 of outlet housing 130. Alternatively, leads 82 can extend from any other side of outlet housing 130. It is envisioned that outlet 76 is suitable for use as part of system 10, as described above, and also suitable for use as a stand-alone electrical outlet for use in conjunction with other known types and configurations of outlet boxes. Additionally, in the preferred embodiment, leads 82 all extend individually from housing 130. In another alternate embodiment, leads 82 are bundled together inside a non-conductive casing and only a predetermined length of each distal end 148 extends past a distal end of the non-conductive casing.

Figure 4:
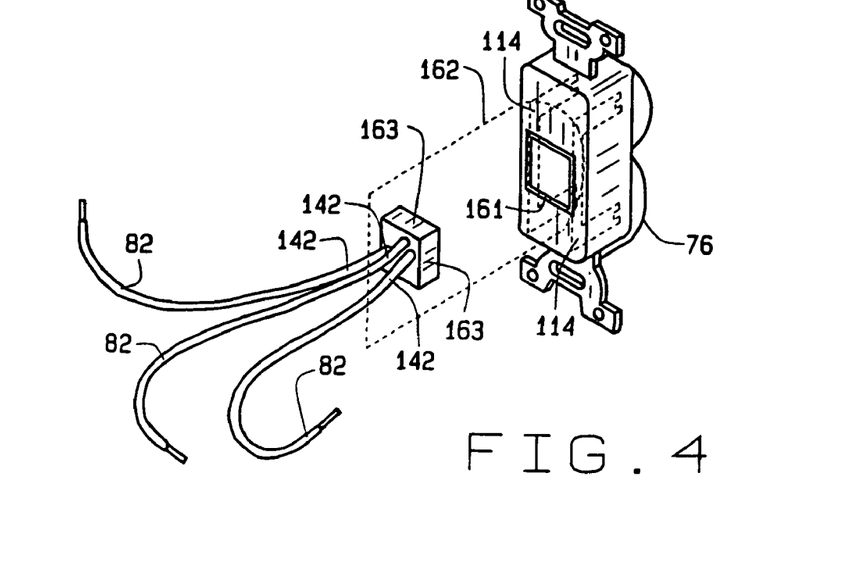
FIG. 4 is a perspective view of an alternate embodiment of the electrical outlet shown in FIG. 3.

FIG. 4 is an alternate embodiment of outlet 76 wherein outlet 76 includes a first connector 161 of a connector module 162. First connector 161 is connected to receptor structure 114. Additionally, the proximal ends 142 of each lead 82 are connected to a mating second connector 163 of connector module 162, thereby forming a subassembly that can be coupled with and decoupled from first connector 161. Therefore, the subassembly can be connected to network branch 22, and outlet 76 can subsequently be connected to network branch 22 by coupling the subassembly second connector 163 with mating first connector 161 of outlet 76. Connector module 162 can be any suitable electrical connection assembly such as a pronged plug assembly or any suitable modular electrical connection device.

Figure 5:
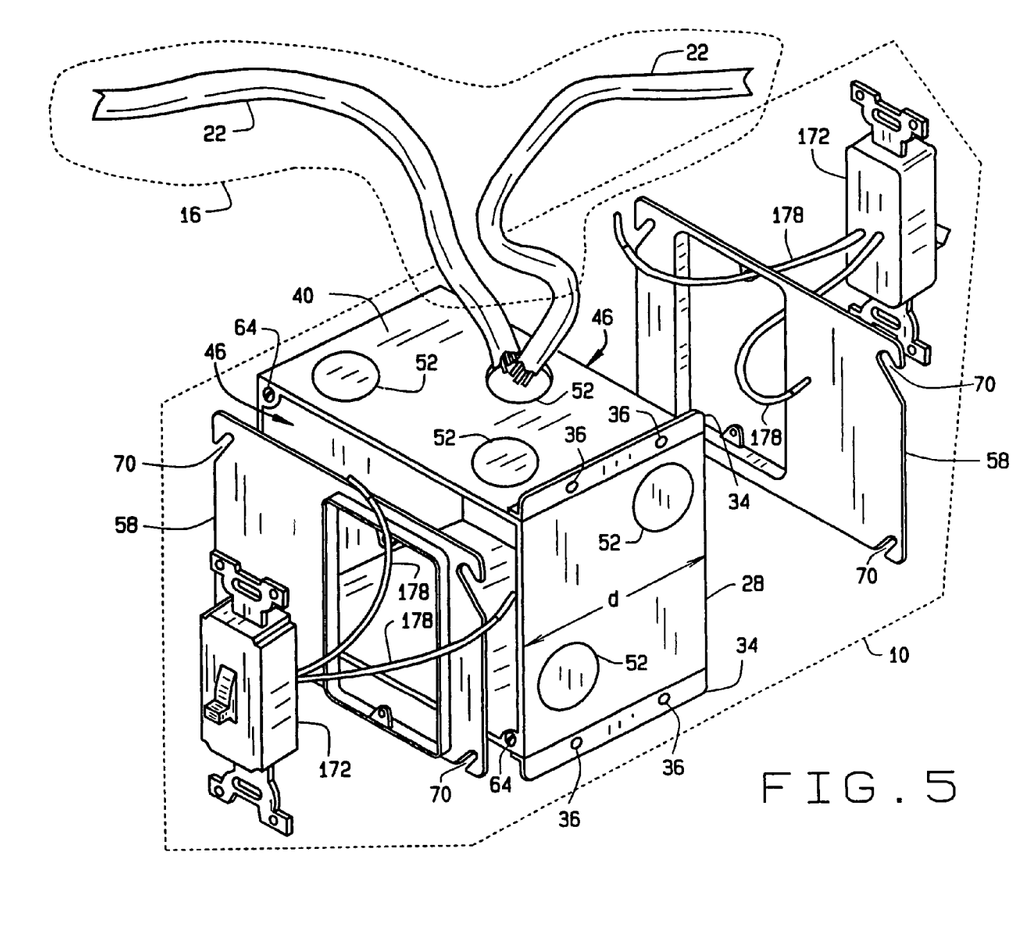
FIG. 5 is a schematic of an alternate embodiment of the system shown in FIG. 1 including a plurality of electrical control modules.

FIG. 5 is an alternate embodiment of system 10 including a plurality of electrical control modules 172. Control modules 172 include a plurality of integral leads 178 that are integrally formed or assembled with control module 172 in the same manner and fashion as lead 82 (shown in FIG. 3) are integrally formed with outlet 76 (shown in FIG. 3). Additionally, integral leads 178 connect to a network branch 22 in the same manner and fashion as leads 82. Control modules 172 are any electrical control module, such as switches or rheostats that monitor and/or control the flow of electricity. Additionally, control modules 172 connect to frames 58 in the same manner and fashion as electrical outlets 76 (shown in FIG. 1). In yet another alternate embodiment, system 10 includes any combination of at least one electrical outlet 76 and at least one control module 172.

Although system 10 has been described in conjunction with a commercial or residential electrical supply network, it is envisioned that system 10 could be utilized in conjunction with other networks that are utilized for the transmission of mediums other than electricity, such a light or sound. For example, system 10 could be implemented in conjunction with a fiber optic network, or a low voltage communications network, e.g. telephone network, or a coaxial communication network, e.g. a cable television network, or a satellite communication network, or an audio network, e.g. an audio entertainment network or public address network. In which case outlets 76 and control modules 172 would be outlets and control modules associated with such networks.

While the invention has been described in terms of various specific embodiments, those skilled in the art will recognize that the invention can be practiced with modification within the spirit and scope of the claims.

What is claimed is:

1. An electrical current carrying wiring device structured for installation into a separate and autonomous electrical box mountable to at least one support structure of a building, said current carrying wiring device comprising: two primary components that are separate and autonomous from any component of the electrical box, the current carrying wiring device structured to be directly connected, within an interior space of the electrical box, to distal ends of at least two of a plurality of supply wires of a pre-installed electrical power supply distribution network of the building that are extending through a wall of the electrical box into the interior space of the electrical box, the direct connection being made absent contact with any component of the electrical box or any intermediary component mountable within the electrical box, the two primary components including:

a first component that is separate and autonomous from any component of the electrical box and is structured to be affixed to an open side of the electrical box, the first component comprising:

a housing that is separate and autonomous from any component of the electrical box; and a first connector disposed within the housing and connected to a current flow control device within the housing that controls a flow of an electrical current through the current carrying wiring device provided by the supply wires of the pre-installed electrical power supply distribution network of the building that are extending through the wall of the electrical box into the interior space of the electrical box; and a second component that is separate and autonomous from any component of the electrical box and is structured to be removably connectable with the first component absent any contact with any component of the electrical box, the second component comprising:

a second connector structured to be removably interlockingly mateable with the first connector absent any contact with any component of the electrical box or any intermediary component mountable within the electrical box; and a plurality of flexible wire leads extending from the second connector, each wire lead comprising a proximal end integrally disposed within a body of the second connector and an opposing distal end, at least two of which are structured to be directly connected, within the interior space of the electrical box, to the distal end of a respective one of the supply wires of the pre-installed electrical power supply distribution network of the building that are extending through the wall of the electrical box into the interior space of the electrical box such that a single point parallel electrical connection is provided between the pre-installed electrical power supply distribution network and the current flow control device located within the housing of the first component when the first connector is removably interlockingly mated with the second connector.

2. The electrical current carrying wiring device of claim 1, wherein each flexible wire lead comprises a wire and a layer of insulating material covering a portion of the wire such that a predetermined length of the wire extends past the insulating material at the distal end of each flexible wire lead.

3. The electrical current carrying wiring device of claim 1, wherein the flexible wire leads are bundled together inside a non-conductive casing such that at least a portion of the distal ends of the leads extends past a distal end of the non-conductive casing.

4. The electrical current carrying wiring device of claim 1 wherein the housing comprises a non-conductive outer surface free from exposed electrically conductive surfaces.

5. The electrical current carrying wiring device of claim 1, wherein the current carrying wiring device comprises a two-part electrical receptacle which includes the first connector that is connected to a plurality of electrical receptors located within the housing, the receptors configured to receive a plug connected to an electrical load device such that the plug contacts the electrical receptors to access the electrical current provided by the supply wires of the pre-installed electrical power supply distribution network of the building that are extending through the wall of the electrical box into the interior space of the electrical box to perform an operational function of the electrical load device.

6. The electrical current carrying wiring device of claim 1, wherein the current flow control device comprises a switch structured to control a flow of electrical current through the current carrying wiring device.

7. The electrical current carrying wiring device of claim 1, wherein the current flow control device comprises a rheostat structured to control an amount of flow of electrical current through the current carrying wiring device.

8. The electrical current carrying wiring device of claim 1, wherein the current flow control device comprises an electrical outlet structured to receive a plug connected to an electrical load device and a switch structured to control a flow of electrical current through the current carrying wiring device.

9. The electrical current carrying wiring device of claim 1, wherein the current carrying wiring device comprises an electrical outlet structured to receive a plug connected to an electrical load device and a rheostat structured to control an amount of flow of electrical current through the current carrying wiring device.

10. The electrical current carrying wiring device of claim 1, wherein the first connector comprises a female type receptor and the second connector comprises a male type connector structured to removably interlockingly mate within the female receptor.

11. A two-piece receptacle structured for installation into an electrical box mountable to at least one support structure of a building, the two-piece receptacle being separate and autonomous from any component of the electrical box and structured to be directly connected, within an interior space of the electrical box, to distal ends of at least two of a plurality of supply wires of a pre-installed electrical power supply distribution network of the building that are extending through a wall of the electrical box into the interior space of the electrical box, the direct connection being made absent contact with any component of the electrical box or any intermediary component mountable within the electrical box, the two-piece receptacle comprising:

a first component that is separate and autonomous from any component of the electrical box and is structured to be affixed to an open side of the electrical box, the first component comprising:

a housing that is separate and autonomous from any component of the electrical box; and a first connector disposed within the housing and connected to a plurality of electrical receptors located within an interior of the housing, the receptors structured to receive a plug of an electrical load device that utilizes an electrical current provided by the supply wires of the pre-installed electrical power supply distribution network of the building that are extending through the wall of the electrical box into the interior space of the electrical box to perform an operational function of the electrical load device; and a second component that is separate and autonomous from any component of the electrical box and is structured to be removably connectable with the first component absent any contact with any component of the electrical box, the second component comprising:

a second connector structured to be removably interlockingly mateable with the first connector absent any contact with any component of the electrical box or any intermediary component mountable within the electrical box; and a plurality of flexible wire leads extending from the second connector, each wire lead comprising a proximal end integrally disposed within a body of the second connector and an opposing distal end, at least two of which are structured to be directly connected, within the interior space of the electrical box, to the distal end of a respective one of the supply wires of the pre-installed electrical power supply distribution network of the building that are extending through the wall of the electrical box into the interior space of the electrical box such that a single point parallel electrical connection is provided between the pre-installed electrical power supply distribution network and the receptors within the housing of the first component when the first connector is removably interlockingly mated with the second connector, the single point parallel electrical connection is used to provide the current from the supply wires of the pre-installed electrical power supply distribution network of the building to the electrical load device.

12. The two-piece receptacle of claim 11, wherein the first connector comprises a female type receptor and the second connector comprises a male type connector structured to removably interlockingly mate within the female receptor.

13. The two-piece receptacle of claim 11, wherein each flexible wire lead comprises a wire and a layer of insulating material covering a portion of the wire such that a predetermined length of the wire extends past the insulating material at the distal end of each flexible wire lead.

14. The two-piece receptacle of claim 11, wherein the flexible wire leads are bundled together inside a non-conductive casing such that at least a portion of the distal ends of the leads extends past a distal end of the non-conductive casing.

15. The two-piece receptacle of claim 11 wherein the housing comprises a non-conductive outer surface free from exposed electrically conductive surfaces.

16. An electrical receptacle system, said system comprising:

an electrical box structured to be mounted to at least one support structure within a wall of a building, the electrical box including an open side and a plurality of walls, at least one wall including an aperture through which a plurality of supply wires of a pre-installed electrical power supply distribution network of the building can be extended into an interior space of the electrical box; and a two-piece receptacle that is separate and autonomous from any component of the electrical box, the two-piece receptacle structured to be directly connected, within an interior space of the electrical box, to distal ends of at least two of the supply wires of the pre-installed electrical power supply distribution network of the building that are extending through the electrical box aperture into the interior space of the electrical box, the direct connection being made absent contact with any component of the electrical box or any intermediary component mountable within the electrical box, the two-piece receptacle including:
    a first component that is separate and autonomous from any component of the electrical box and is structured to be affixed to the open side of the electrical box, the first component comprising:
        a housing that is separate and autonomous from any component of the electrical box; and
        a first connector disposed within the housing and connected to a plurality of electrical receptors located within an interior of the housing, the receptors structured to receive a plug of an electrical load device that utilizes an electrical current provided by the pre-installed electrical power supply distribution network to perform an operational function of the electrical load device; and
    a second component that is separate and autonomous from any component of the electrical box and is structured to be removably connectable with the first component absent any contact with any component of the electrical box, the second component comprising:
        a second connector structured to be removably interlockingly mateable with the first connector absent any contact with any component of the electrical box or any intermediary component mountable within the electrical box; and
        a plurality of flexible wire leads extending from the second connector, each wire lead comprising a proximal end integrally disposed within a body of the second connector and an opposing distal end, at least two of which are structured to be directly connected, within the interior space of the electrical box, to the distal end of a respective one of the supply wires of the pre-installed electrical power supply distribution network of the building that are extending through the electrical box aperture into the interior space of the electrical box such that a single point parallel electrical connection is provided between the pre-installed electrical power supply distribution network and the receptors within the housing of the first component when the first connector is removably interlockingly mated with the second connector, wherein the single point parallel electrical connection is used to provide the current from the supply wires of the pre-installed electrical power supply distribution network of the building to the electrical load device.

17. The electrical receptacle system of claim 16, wherein the first connector comprises a female type receptor and the second connector comprises a male type connector structured to removably interlockingly mate within the female receptor.

18. The electrical receptacle system of claim 16, wherein each flexible wire lead comprises a wire and a layer of insulating material covering a portion of the wire such that a predetermined length of the wire extends past the insulating material at the distal end of each flexible wire lead.

19. The electrical receptacle system of claim 16 wherein the housing comprises a non-conductive outer surface free from exposed electrically conductive surfaces.

20. A method of installing a two-piece electrical receptacle into an electrical outlet box, the two-piece electrical receptacle comprising a first component that is separate and autonomous from any component of the electrical box, the first component including a first connector and is structured to be affixed to the open side of the electrical box, and a second component that is separate and autonomous from any component of the electrical box, the second component including a second connector structured to be removably connectable with the first connector absent any contact with any component of the electrical box or any intermediary component mounted within the electrical box, said method comprising:
    accessing, via the open side of the electrical box, a plurality of supply wires of a pre-installed electrical power supply distribution network of a building that are extending into an interior space of the electrical box that is mounted to at least one support structure of the building, the plurality of supply wires of the pre-installed electrical power supply distribution network extending through an aperture in one of a plurality of sides of the electrical box into the interior space of the electrical box;
    directly connecting, within the interior space of the electrical box, at least two of a plurality of flexible wire leads extending from the second connector to a respective one of the supply wires of the pre-installed electrical power supply distribution network, the direct connection being made absent any contact with any component of the electrical box or any intermediary component mounted within the electrical box, each flexible wire lead comprising a proximal end integrally disposed within a body of the second connector and an opposing distal end structured to be directly connected, within the interior space of the electrical box, to the distal end of the respective one of the supply wires of the pre-installed electrical power supply distribution network that are extending into the interior space of the electrical box; and
    removably interlockingly connecting the second connector to the first connector absent any contact with any component of the electrical box or any intermediary component mounted within the electrical box, the first connector being disposed within a housing of the first component of the two-piece receptacle and connected to a plurality of electrical receptors located within an interior of the housing, the receptors structured to receive a plug of an electrical load device that utilizes an electrical current provided by the pre-installed electrical power supply distribution network to perform an operational function of the electrical load device, whereby removably interlockingly connecting the second connector to the first connector provides a single point parallel electrical connection between the pre-installed electrical power supply distribution network and the receptors, wherein the single point parallel electrical connection is used to provide the current from the supply wires of the pre-installed electrical power supply distribution network to the electrical load device.

\* \* \* \* \*